(12) United States Patent
Lin et al.

(10) Patent No.: US 6,233,163 B1
(45) Date of Patent: May 15, 2001

(54) AUTOMATIC BALANCE ADJUSTING DEVICE FOR AC POWER SUPPLY

(75) Inventors: Song-Yi Lin, Nantou Hsien; Kuang-Chih Shih, Taipei, both of (TW)

(73) Assignee: Phoenixtex Power Co., Ltd., Taipei (TW)

( * ) Notice: Subject to any disclaimer, the term of this patent is extended or adjusted under 35 U.S.C. 154(b) by 0 days.

(21) Appl. No.: 09/688,600

(22) Filed: Oct. 16, 2000

(51) Int. Cl.[7] .................................................. H02M 1/12
(52) U.S. Cl. ............................................................ 363/41
(58) Field of Search .................................. 363/41, 73, 34, 363/39; 323/282, 284, 356; 324/102

(56) References Cited

U.S. PATENT DOCUMENTS

| 4,500,837 | * | 2/1985 | Shuey et al. ........................ 324/102 |
| 4,994,767 | * | 2/1991 | Hawkes .............................. 332/123 |
| 5,479,090 | * | 12/1995 | Schultz ............................... 323/284 |

* cited by examiner

*Primary Examiner*—Adolf Deneke Berhane
(74) *Attorney, Agent, or Firm*—Hedman & Costigan, P.C.

(57) ABSTRACT

An automatic balance adjusting device for an AC power supply is provided between the AC current output terminals of an AC power supply and its feedback control circuit. The device uses a two-level filter to extract the DC component of an AC output signal. The DC error is accumulated and amplified by an integrator and converted from a voltage form to a current form. Through a photo coupler designed for the separation purpose, the error signal is sent back to the feedback control circuit to perform compensation. Thus, the device can achieve the purpose of automatically balancing the positive and negative half-cycle waveform of the output signal.

5 Claims, 3 Drawing Sheets

AUTOMATIC BALANCE ADJUSTING DEVICE FOR AC POWER SUPPLY

BACKGROUND OF THE INVENTION

1. Field of Invention

The present invention relates to an automatic balance adjusting device for an AC power supply and, more particularly, to an automatic balance adjusting device for an AC power supply that can measure the DC component of the AC power output, amplify and convert it into a current form, and send the signal through a photo coupler to a feedback control circuit to perform automatic compensation.

2. Description of Related Art

With reference to FIG. 3, a feedback control circuit (not shown but usually composed of a pulse width modulator (PWM)) is employed with the output circuit of an AC power supply to control the electrical communication among four power transistors Q1, Q2, Q3, Q4 to generate an AC output at the output terminals. The feedback control circuit obtains a feedback signal from the AC output terminals to perform compensation and to ensure stable power output.

However, when the power transistors Q1, Q2, Q3, Q4 and the feedback control circuit generate errors, the positive and negative half-cycle waves of the AC current output from the output terminals will have slight differences. In this situation, the waveforms of the positive and negative half-cycle waves are not the same. If the electrical load is inductive, the inductance in the load will be out of balance due to the integration of the voltage over time. This eventually will saturate the inductor.

Therefore, conventional AC power supplies often have different positive and negative half-cycle waveforms due to the errors in the power elements and the feedback control circuit. Providing an inductive load for a long time will saturate the inductance of the load. It is thus desirable to find a solution for such a problem.

SUMMARY OF THE INVENTION

A principal objective of the present invention is to provide an automatic balance adjusting device that can effectively detect the DC error component in the AC output signal of an AC power supply and send a converted error signal to a feedback control circuit to perform compensation.

The main technique to achieve the foregoing objective consists of providing an automatic balance adjusting device between the output terminals of the AC power supply and the feedback control circuit. The automatic balance adjusting device comprises a filter circuit, an integrator, a voltage/current conversion circuit and a separation control circuit. The filter circuit consists of a two-level filter and connects to the AC power output terminals of the AC power supply to detect the DC error component of the AC output signal. The integrator is made by using a resistor and a capacitor to provide negative feedback on an operational amplifier and is provided after the output terminals of the filter circuit to perform integrated amplification of the DC error. The voltage/current conversion circuit is composed of an operational amplifier with a resistor as a negative feedback so the output current varies with the input voltage and converts the amplified DC error in the voltage form to a current form. The separation control circuit is a photo coupler and is provided after the output terminals of the voltage/current conversion circuit so that the error signal in the current form can be separately sent back to the feedback control circuit to perform compensation.

The foregoing circuit design can effectively detect the DC component in the AC output waveform, amplify and convert it into a current form and send the error signal separately back to the feedback control circuit to compensate the difference between the positive and negative half-cycle waveforms.

Other features and advantages of the present invention will be apparent from the following detailed description, which proceeds with reference to the accompanying drawings.

DETAILED DESCRIPTION OF THE INVENTION

Figure 1:
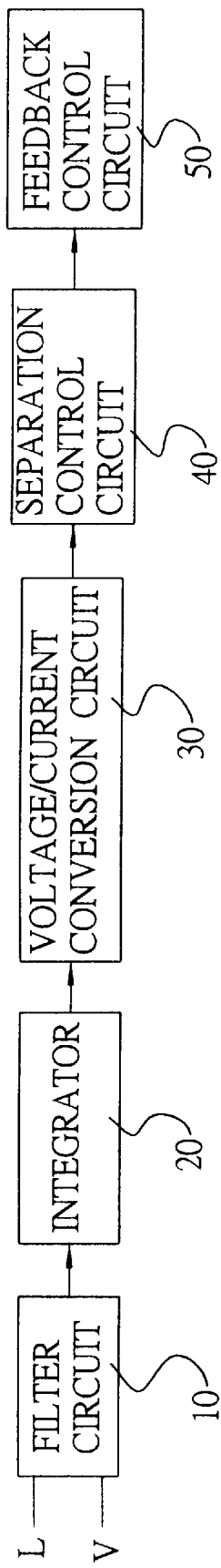
FIG. 1 is a block diagram of the automatic balance adjusting device for an AC power supply in accordance with the present invention.
Figure 2:
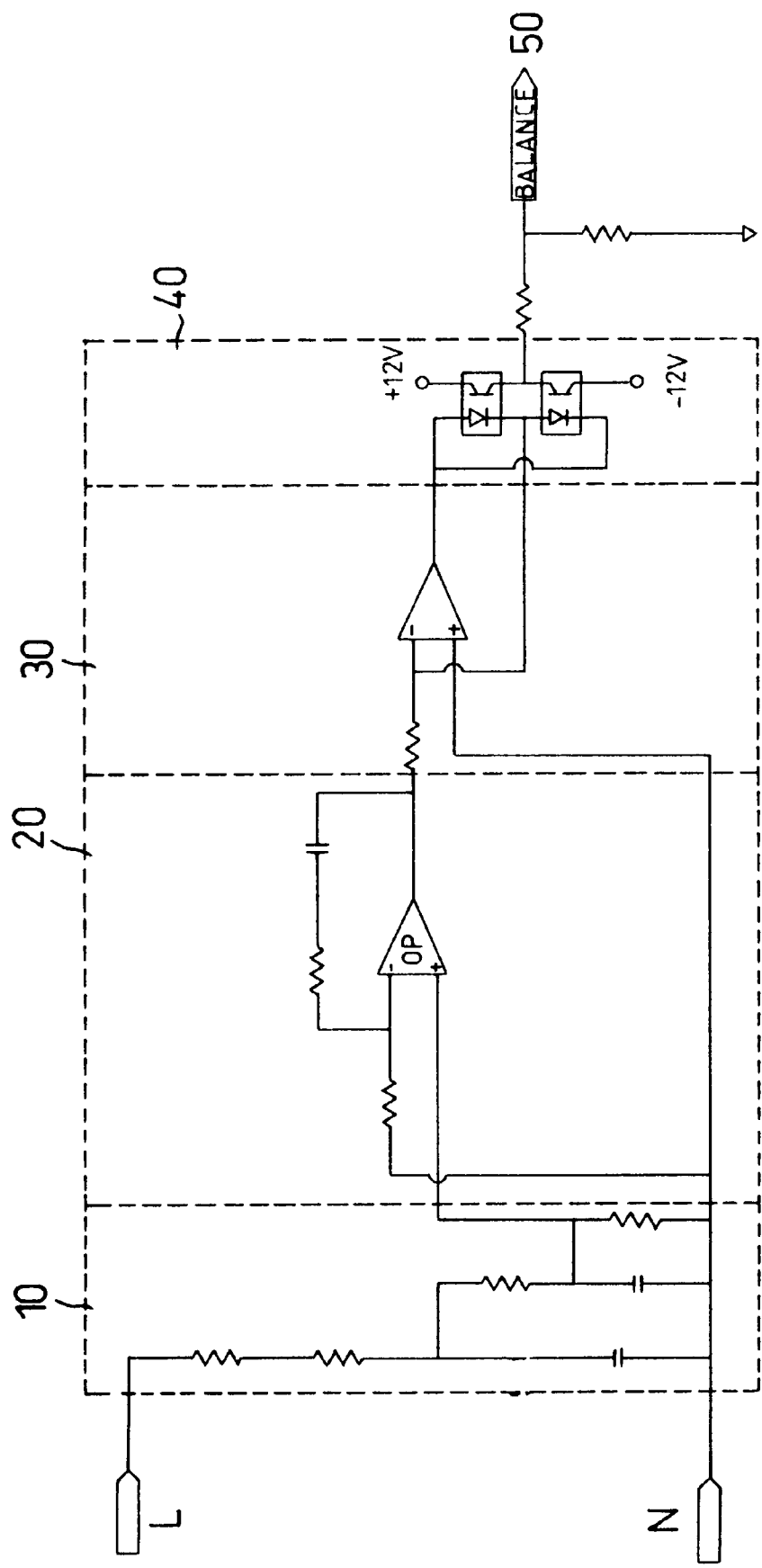
FIG. 2 is a detailed circuit diagram of the automatic balance adjusting device for an AC power supply in FIG. 1.

With reference to FIG. 1, the automatic balance adjusting device in accordance with the present invention is provided between the output terminals of an AC power supply and a feedback control circuit 50. With reference to FIG. 2, the device comprises a filter circuit 10, an integrator 20, a voltage/current conversion circuit 30 and a separation control circuit 40.

The filter circuit 10 connects to the AC power output terminals of the AC power supply (not shown) to detect the DC error component of the AC output signal. The filter circuit 10 is composed of a two-level filter, and the input terminals connect to the AC power supply output terminals L, N to extract the DC component in the AC waveform. The DC component is the main cause of errors.

The integrator 20 is provided after the output terminals of the filter circuit 10 to perform integrated amplification on the DC error. The integrator 20 is comprised of an operational amplifier with a resistor and a capacitor connected to provide negative feedback to perform integrated amplification on the DC error. The DC error is a voltage signal.

The voltage/current conversion circuit 30 converts the amplified DC voltage error signal to a current signal. The voltage/current conversion circuit 30 is comprised of an operational amplifier with a resistor connected to provide negative feedback. The output current varies with the input voltage. The separation control circuit 40 is provided after the output terminals of the voltage/current conversion circuit 30 so that the error signal in the current form can be separately sent back to the feedback control circuit 50 to perform compensation.

The separation control circuit 40 is a photo coupler. The converted error signal is sent to the input terminals of the photo coupler, and the output terminals of the photo coupler then sends a signal to the feedback control circuit to adjust the DC error.

Figure 3:
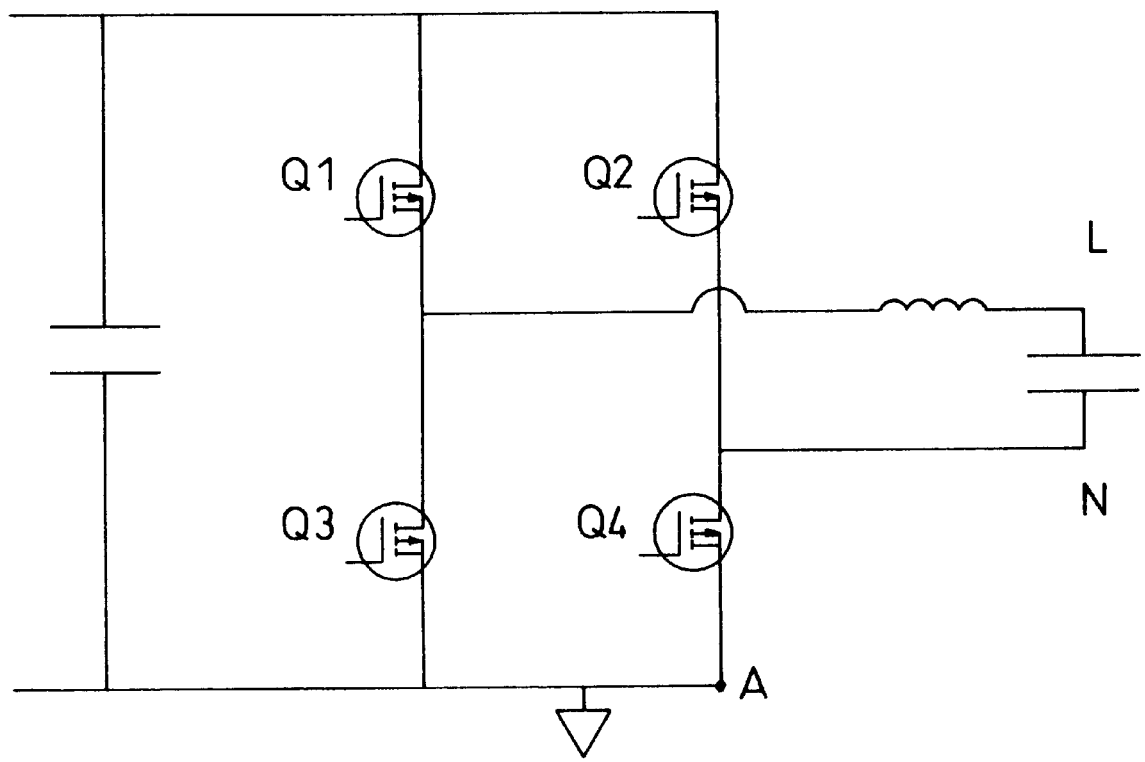
FIG. 3 is a circuit diagram of the output circuit of an AC power supply.

The separation control circuit is used because the references of the AC power supply output terminals L, N and the feedback control circuit are not the same. With reference to FIG. 3, the automatic balance adjusting device is provided between the AC power supply output terminals L, N and the feedback control circuit (not shown). If the reference of the feedback control circuit is set at point A, then it is different from the reference of the two terminals L, N. In this situation, it is not easy to send the DC error signal back to the feedback control circuit. Therefore, the separation control circuit 40 is employed to send the error signal separately back to the feedback control circuit. This then achieves the objective of automatic error compensation.

In summary, the automatic balance adjusting device can effectively detect the DC error component in the output signal of an AC power supply, perform integrated amplification on it, convert it to a current form and send the error signal back to a feedback control circuit separately to achieve the objective of automatic balance adjusting. Thus, the disclosed design can effectively solve the problem of different positive and negative half-cycle waveforms due to errors in the power element or feedback control that will eventually saturate the inductance in the inductive load.

The invention may be varied in many ways. Such variations are not to be regarded as a departure from the spirit and scope of the invention, and all such modifications as would be obvious to one skilled in the art are intended to be included within the scope of the following claims.

What is claimed is:

1. an automatic balance adjusting device provided between the output terminals of an ac power supply and a feedback control circuit, which comprises:

a filter circuit, which connects to the AC power output terminals of the AC power supply to detect the DC error component of the AC output signal;

an integrator, which is provided after the output terminals of the filter circuit to perform integrated amplification on the DC error;

a voltage/current conversion circuit, which converts the amplified DC error in the voltage form into a current form; and a separation control circuit, which is provided after the output terminals of the voltage/current conversion circuit so that the error signal in the current form can be separately sent back to the feedback control circuit to perform compensation.

2. The device of claim 1, wherein the filter circuit is composed of a two level filter.

3. The device of claim 2, wherein the integrator comprises an operational amplifier with a resistor and a capacitor connected in a way to provide negative feedback.

4. The device of claim 3, wherein the voltage/current conversion circuit comprises an operational circuit with a resistor connected in a way to provide negative feedback and the output current varies with the input voltage.

5. The device of claim 4, wherein the separation control circuit is a photo coupler.

* * * * *